D. SMITH.
Farm-Truck.
No. 208,498. Patented Oct. 1, 1878.
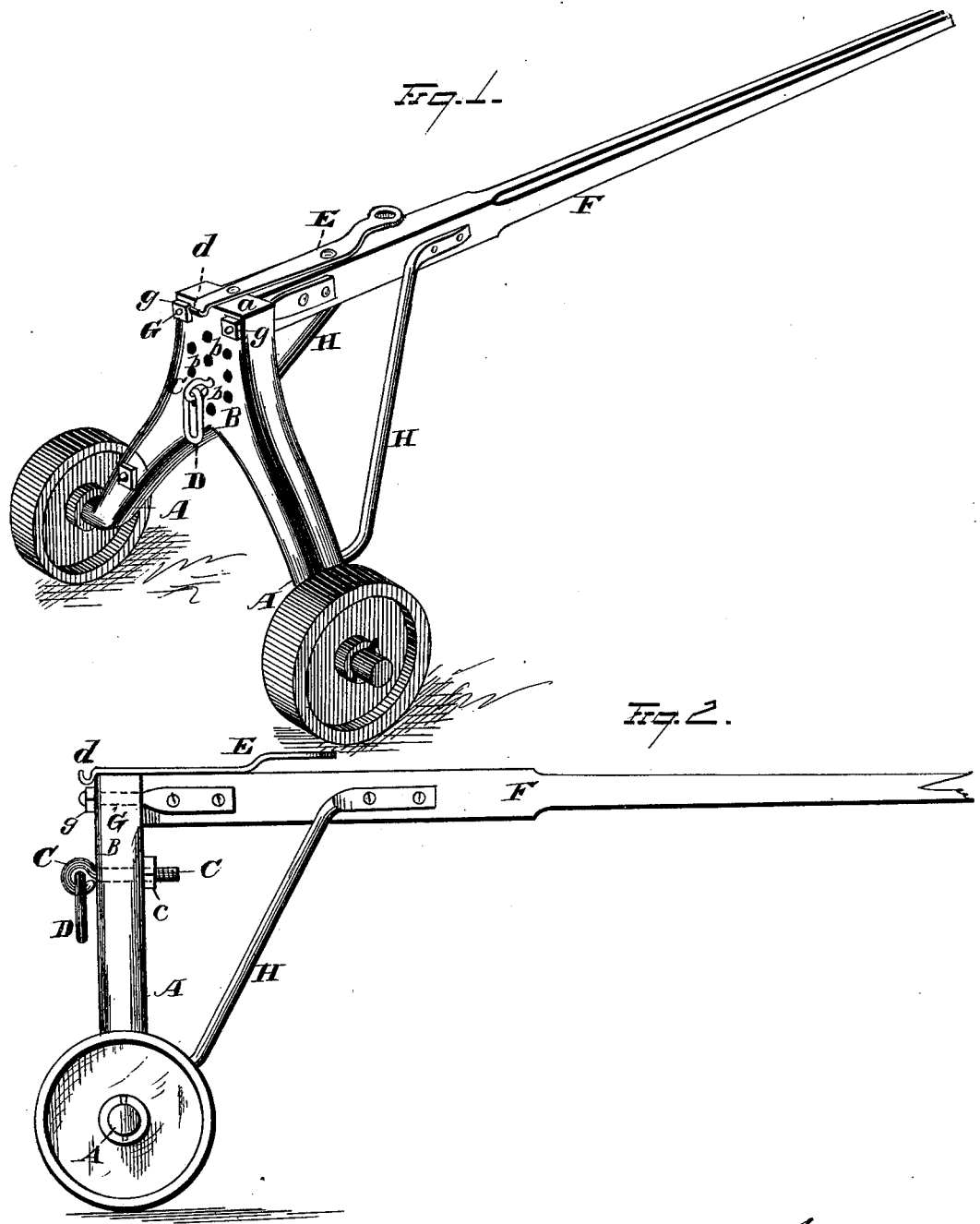

UNITED STATES PATENT OFFICE.

DAVID SMITH, OF JAMESTOWN, NEW YORK, ASSIGNOR TO MOSES B. SMITH, OF SAME PLACE.

IMPROVEMENT IN FARM-TRUCKS.

Specification forming part of Letters Patent No. 208,498, dated October 1, 1878; application filed July 22, 1878.

*To all whom it may concern:*

Be it known that I, DAVID SMITH, of Jamestown, in the county of Chautauqua and State of New York, have invented certain new and useful Improvements in Farm-Trucks; and I do hereby declare the following to be a full, clear, and exact description of the invention, such as will enable others skilled in the art to which it pertains to make and use it, reference being had to the accompanying drawings, which form part of this specification.

My invention relates to farm-trucks, and is designed to provide a truck to which may be adjustably attached a plow, drag, scraper, cultivator, or other suitable farm implement.

It consists in a construction as follows: The axle, made in a single piece, is curved or arched, with its central raised portion flattened on its top surface and perforated in its horizontal sectional body. By means of the series of holes, an eyebolt provided with a link to connect with the attached implement can be secured at different points to the axle, and thus adjust said implement either laterally, vertically, or both laterally and vertically.

The arch form of the axle allows the truck-wheels to be of small diameter, with their axle-bearings but slightly raised from the ground, so that there may be no tendency of the truck to tip to one side or to be upset, while at the same time the draft of the tongue may be practically or approximately in line with the draft of the plow or similar implement attached to the truck.

The tongue is connected with the arched axle by means of a strap-bolt on each of its two vertical sides, which pass through the central raised portion thereof, and also by means of two diagonally-inclined braces, which extend from the sides of the axle forward of the bolt-straps to the respective lower end portions of the axle. The king or hammer bolt strap extends rearwardly from its connection with the tongue, and projects over the flat central top of the axle. This projecting end is made in hook form, so as to be adapted to have the plow or other implement secured thereto in raised position from the ground when it is desired to transport the same from one place to another, without having it perform its usual working functions.

Referring to the drawings, Figure 1 is a view, in rear perspective, of my truck. Fig. 2 is a side elevation thereof.

The axle A is made in arched or curved form, with its central portion, B, well raised from the horizontal plane which passes through the axle-bearings of the truck-wheels. This central raised portion has a flat top or upper surface, *a*, while its body is provided with a series of transverse holes, *b*, passing horizontally through the same. A hook-bolt, C, engages respectively with these different holes, and is secured therein by a nut, *c*. A link, D, connects with the eye of this bolt, and is adapted to secure the farm implement suitable for such use to the truck. This is preferably done by attaching said link to the clevis of such implement; but other manner of fastening may be substituted for the above, and instead of the eyebolt and link any suitable device or mechanism may be used which will adjustably engage with the series of holes in the axle and connect the latter to the implement to be used. Such manner of connection allows the plow or other implement to work at greater or less depth, and to one side or the other, as it is apparent the adjustment may be vertical or lateral, or both vertical and lateral.

The metallic strap E, which engages with the usual hammer or king bolt in attaching the double-tree to the tongue F, extends rearwardly from its point of engagement with the latter, and passing over the flat central top of the axle, it projects from the same in the form of a hook, *d*. To this hook the clevis of the plow or other implement may be connected so as to maintain the latter suspended above the ground, when it is desired to carry the same from one point to another without having it perform its customary work.

The tongue may be connected with the axle in any suitable manner without affecting the invention above described.

Two strap-bolts, G, fastened respectively to the vertical sides of the tongue, pass through suitable engaging-holes made in the upper central body of the axle, and clamp the tongue thereto by nuts *g*. Diagonal braces H have their front ends fastened to said sides of the tongue forward of the strap-bolts, while their rear ends pass through and are secured respectively to the lower end portions of the axle above the bearings for the truck-wheels. This firmly secures the tongue to the axle, and attaches the two together, so as to prevent any lateral strain from falling upon the vertically-inclined portions of the axle. Preferably the hammer or king-bolt strap is also secured to the top of the axle.

I am aware that farm-trucks have heretofore been made which adjusted the implement attached thereto both laterally and vertically, and also that they have been adapted to support said implement in raised position from the ground when the same is not in use; hence my invention consists in the particular construction and adaptation of parts as appears in the following claim.

Having fully described my invention, what I claim, and desire to secure by Letters Patent, is—

The combination, with axle A, formed with the central arched body, B, and flat top *a*, made in single piece therewith, of eyebolt C, which is adjustably fastened in the series of holes *b*, passing transversely through said arched body, and is provided with loose link D, together with hammer-strap E, projecting rearwardly over said flat top, and formed with hook extremity *e*, substantially as set forth.

In testimony that I claim the foregoing I have hereunto set my hand this 17th day of July, 1878.

DAVID SMITH.

Witnesses:
J. LAMBERT INGERSOLL,
JOHN B. RAWSON.